US010378589B2

(12) United States Patent
Kim

(10) Patent No.: US 10,378,589 B2
(45) Date of Patent: Aug. 13, 2019

(54) SLIDING CAGE OF UNIVERSAL JOINT FOR VEHICLE

(71) Applicant: DREAMTEC., INC., Asan-si, Chungcheongnam-do (KR)

(72) Inventor: Hong-Keun Kim, Seoul (KR)

(73) Assignee: DREAMTEC., INC., Asan-si (KR)

( * ) Notice: Subject to any disclaimer, the term of this patent is extended or adjusted under 35 U.S.C. 154(b) by 365 days.

(21) Appl. No.: 15/449,513

(22) Filed: Mar. 3, 2017

(65) Prior Publication Data

US 2017/0268574 A1 Sep. 21, 2017

(30) Foreign Application Priority Data

Mar. 16, 2016 (KR) ........................ 10-2016-0031539

(51) Int. Cl.

| | |
|---|---|
| ***F16C 3/035*** | (2006.01) |
| ***F16D 3/06*** | (2006.01) |
| ***F16C 29/00*** | (2006.01) |
| *F16D 3/38* | (2006.01) |
| *F16C 29/04* | (2006.01) |

(52) U.S. Cl.

CPC .............. *F16D 3/065* (2013.01); *F16C 3/035* (2013.01); *F16C 29/002* (2013.01); *F16C 29/007* (2013.01); *F16C 29/04* (2013.01); *F16C 2326/24* (2013.01); *F16C 2361/41* (2013.01); *F16D 3/38* (2013.01)

(58) Field of Classification Search

CPC ........ F16C 3/035; F16C 3/065; F16C 29/002; F16C 29/007; F16C 29/04; B62D 1/16; B62D 1/184; B62D 1/189; B62D 1/195

See application file for complete search history.

(56) References Cited

U.S. PATENT DOCUMENTS

| | | | | |
|---|---|---|---|---|
| 3,800,558 A * | 4/1974 | Buthe | F16C 29/0697 | 464/168 |
| 4,254,639 A * | 3/1981 | Teramachi | F16C 29/04 | 464/167 |
| 4,406,502 A * | 9/1983 | Teramachi | F16C 29/0697 | 384/45 |
| 4,509,386 A * | 4/1985 | Kimberlin | B62D 1/192 | 188/371 |

(Continued)

FOREIGN PATENT DOCUMENTS

KR 10-2014-0039660 A 4/2014

*Primary Examiner* — Daniel J Wiley

(74) *Attorney, Agent, or Firm* — Novick, Kim & Lee, PLLC; Jae Youn Kim

(57) ABSTRACT

The present invention relates to a sliding cage of universal joint for vehicle, and more particularly, to a sliding cage of universal joint for vehicle for making a shaft joint and a pipe joint smoothly slide as well as operating an elastically contacted needle bearing, installed to the sliding cage, when a universal joint is slipped or delivers rotating torque.

The present invention provides a sliding cage of universal joint for vehicle, comprising: a sleeve; a plurality of mountings positioned to keep distance along the longitudinal direction of the outer side of the sleeve; and a needle bearing and a ball bearing which are installed to the mountings, wherein the sliding cage is provided to the universal joint constructing a steering apparatus for vehicle, thereby being assembled to deliver torque while being slipped toward axial direction.

8 Claims, 7 Drawing Sheets

(56) References Cited

U.S. PATENT DOCUMENTS 4,898,566 A * 2/1990 Hakansson ............. F16C 3/035 464/167
6,343,993 B1 * 2/2002 Duval ...................... B62D 1/16 384/49
6,582,313 B2 * 6/2003 Perrow ................... F16D 3/224 464/145
6,729,648 B2 * 5/2004 Ulintz .................... B62D 1/192 280/777
6,761,503 B2 * 7/2004 Breese .................... F16C 3/035 384/49
6,805,637 B2 * 10/2004 Daenzer ................. B62D 1/185 464/168
6,893,353 B2 * 5/2005 Dutkiewicz ............. F16C 3/035 384/49
6,942,386 B2 * 9/2005 Weissflog .............. B62D 1/185 384/47
7,322,607 B2 * 1/2008 Yamada ................... B62D 1/16 280/755
7,481,130 B2 * 1/2009 Yamada ................. B62D 1/185 280/775
8,157,659 B2 * 4/2012 Kakutani ................. B62D 1/16 464/167
8,197,348 B2 * 6/2012 Eriksson .................. B62D 1/16 464/167
8,460,116 B1 * 6/2013 Smith ..................... F16D 3/065 29/898.03
8,556,736 B2 * 10/2013 Janvier .................... B62D 1/16 384/10
8,915,521 B2 * 12/2014 Cymbal ................. B62D 1/192 280/775
8,931,805 B2 * 1/2015 Buzzard .................. F16D 3/065 280/775
9,217,466 B2 * 12/2015 Ng ...................... F16C 29/0685
2006/0053934 A1 * 3/2006 Bahr ....................... F16C 3/035 74/492
2009/0272220 A1 * 11/2009 Klukowski .............. B62D 1/20 74/493

* cited by examiner

SLIDING CAGE OF UNIVERSAL JOINT FOR VEHICLE

TECHNICAL FIELD

The present invention relates to a sliding cage of universal joint for vehicle, and more particularly, to a sliding cage of universal joint for vehicle for making a shaft joint and a pipe joint smoothly slide as well as operating an elastically contacted needle bearing, installed to the sliding cage, when a universal joint is slipped or delivers rotating torque.

BACKGROUND ART

Generally, there is a steering system in vehicles so that a driver changes moving direction of a vehicle. The steering system consists of: a steering wheel, installed at the front driver's seat and rotated by a driver; a steering column mounted on the bottom of the steering wheel; a gear box for changing tires direction with improved steering force simultaneously with converting rotational motion of the steering wheel into direct motion; and a universal joint for conveying turning force, delivered to the steering column, to the gear box.

The universal joint comprises a shaft joint, and a pipe joint configured to be slipped toward the shaft joint and deliver rotating torque.

There are serrations along the the longitudinal direction of the outer peripheral surface of the shaft joint, and there are splines, corresponding to the serrations, in the inside of the pipe joint. Thus, the shaft joint enables to deliver rotating torque while being linked to the pipe joint through gear combination and being slipped toward axial direction.

As above, when assembling the shaft joint and the pipe joint, a sliding cage, composed of a ball bearing, or combination of a ball bearing and a needle bearing, is mounted on the outer side of the end of the shaft joint so that the shaft joint and the pipe joint may be further elastically slipped.

Further, the surface of the bearing assembled to the sliding cage is covered with lubricants such as grease or oil, and the shaft joint is insertedly assembled to the inside of the pipe joint.

However, if the sliding cage is composed of a ball bearing, or combination of a ball bearing and a needle bearing, the universal joint may be smoothly slipped, but the ball bearing is in line-contact. Thus, dents may be generated in the shaft joint due to the ball and it causes noise generation or performance degradation of a steering apparatus in case of using the steering apparatus.

To overcome such problems, Patent Publication No. 10-2014-0039660, a prior art, has been suggested.

Instead of a ball bearing, the prior art is composed of a cylinder-shaped needle bearing for maintaining good steering condition as well as preventing dent generation of slip bush for rotating torque of the steering apparatus.

However, when a shaft joint of the needle bearing is slipped along the inside of a pipe joint or a universal joint is rotated by operation of a steering wheel, there is a problem that coefficient of friction is high because the whole outer side of the needle bearing is under surface-contact to the inside of the pipe joint.

Accordingly, since the universal joint is not smoothly slipped and rotated, it is not possible to maintain good steering feel of the steering apparatus.

Further, as duration of use of the steering apparatus is accumulated, the needle bearing is worn out due to frictional resistance and torque delivery. Thus, it causes performance degradation of the steering apparatus as well as noise generation since a gap of rotational direction of a steering wheel is getting larger when using the steering apparatus.

PRIOR ART

Reference (Patent document 0001) Korean Patent Publication No. 10-1014-0039660

DISCLOSURE

Technical Problem

For solving above problems, the object of the present invention is to provide a sliding cage of universal joint for vehicle for operating an elastically contacted needle bearing, installed to the sliding cage, when a universal joint is slipped or delivers rotating torque.

Further, the another object of the present invention is to provide a sliding cage of universal joint for vehicle for making a shaft joint and a pipe joint smoothly slide.

Technical Solution

To accomplish above objects, the present invention comprises a sliding cage of universal joint for vehicle, comprising: a sleeve; a plurality of mountings positioned to keep distance along the longitudinal direction of the outer side of the sleeve; and a needle bearing and a ball bearing which are installed to the mountings, wherein the sliding cage is provided to the universal joint constructing a steering apparatus for vehicle, thereby being assembled to deliver torque while being slipped toward axial direction.

The ball bearing and the needle bearing are installed to same mountings, or separately installed to each mounting.

The needle bearing is installed to a central part of mountings and the ball bearing is installed to both ends of the needle bearing respectively when the ball bearing and the needle bearing are installed to same mountings.

The needle bearing, shaped like a cylindrical stick, comprises a body, which forms supporting grooves along the circumferential side, and resilient members, assembled to the supporting grooves formed in the body.

A bottom surface of the supporting grooves forms a straight line and both ends, extended from the bottom surface, form outwardly slanted surfaces The supporting grooves are formed like spirals and the resilient members are shaped like coil springs.

The resilient members are installed at a certain interval from the bottom surface and both ends of the supporting grooves.

A cross-sectional diameter of both ends of the needle bearing body is smaller than that of the body, and the needle bearing body has curved surfaces.

Advantageous Effects

According to the sliding cage of universal joint for vehicle of the present invention, as constituted above, based on resilient members which are made up of coil springs along the external side of a needle bearing body, when a universal joint is slipped or torque works, the resilient members are operated by touching to the inner side of a pipe joint. Then, it enables to prevent performance degradation of a steering apparatus since gaps between the needle bearing and the inner side of the pipe joint are not generated, and to maintain good steering feel as the same as the initial state in spite of accumulated duration of use.

Further, it enables to make a shaft joint and a pipe joint slide more smoothly due to a ball bearing mounted on both ends of the needle bearing.

DESCRIPTION OF THE PREFERRED EMBODIMENTS

The configuration of the present invention will be described in detail with the accompanying drawings.

Figure 1:
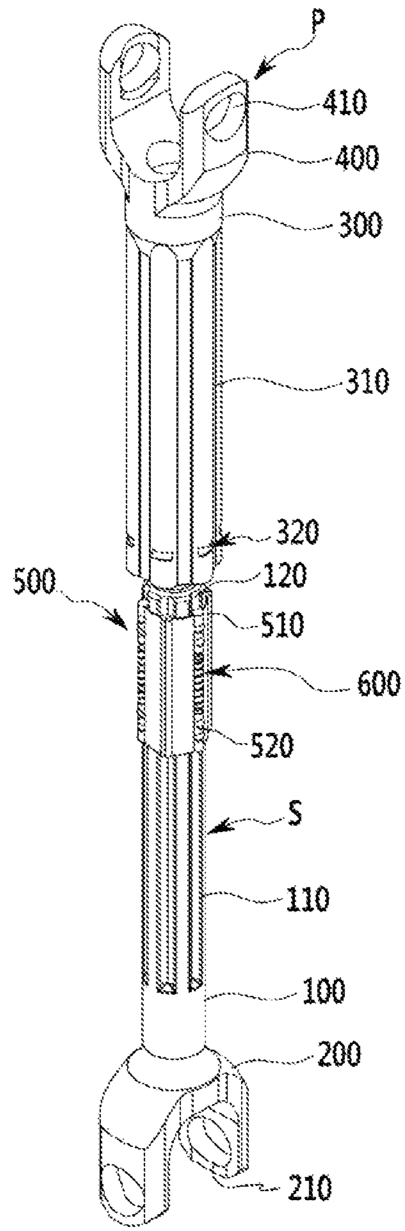
FIG. 1 illustrates an assembly drawing of a universal joint equipped with a sliding cage of universal joint for vehicle according to the present invention.
Figure 2:
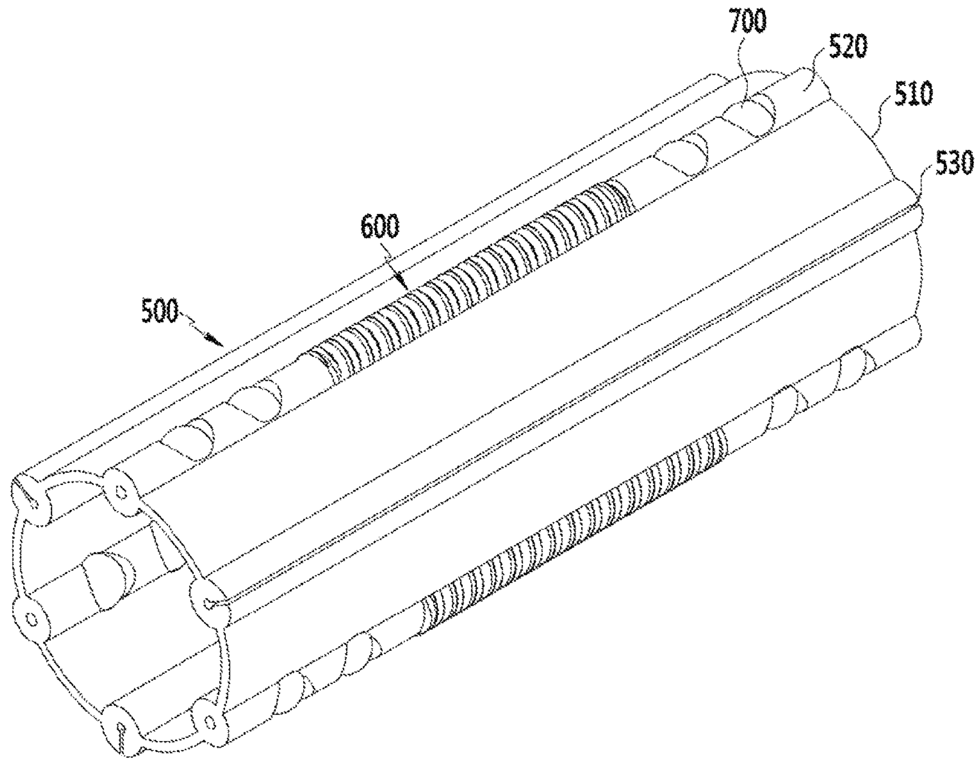
FIG. 2 illustrates a perspective view of the sliding cage of universal joint for vehicle according to the present invention.
Figure 3:
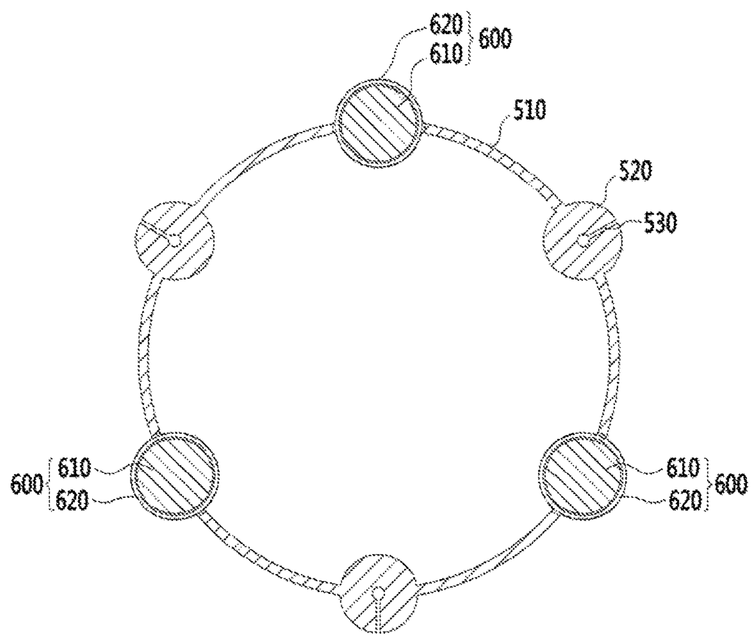
FIG. 3 illustrates a front view of the sliding cage of universal joint for vehicle according to the present invention.
Figure 4:
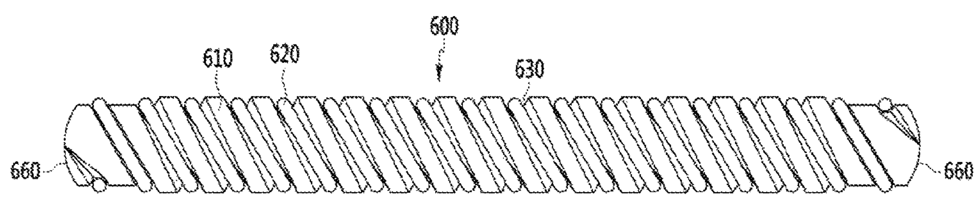
FIG. 4 illustrates a front view of a needle bearing provided to the sliding cage of universal joint for vehicle according to the present invention.
Figure 5:
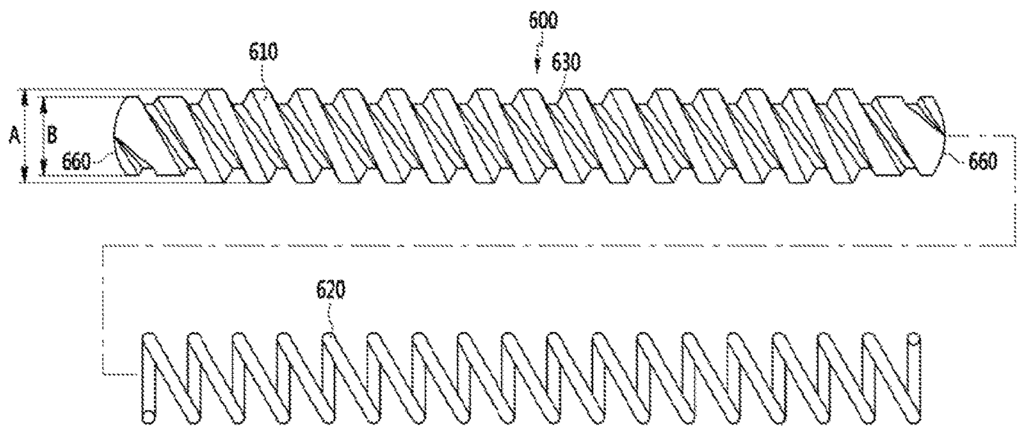
FIG. 5 illustrates a front view of the needle bearing of FIG. 4, disassembled.
Figure 6:
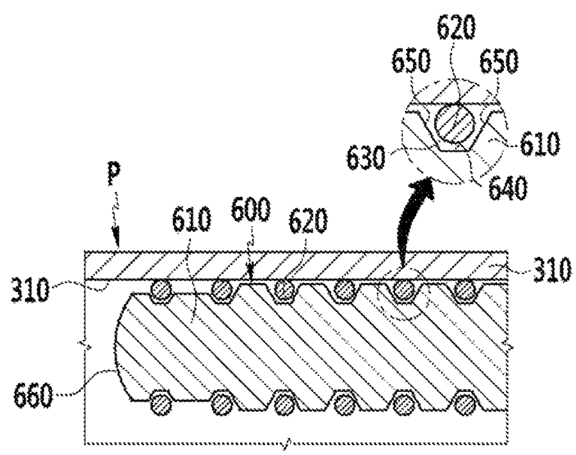
FIG. 6 illustrates an expanded partial section of FIG. 4.
Figure 7:
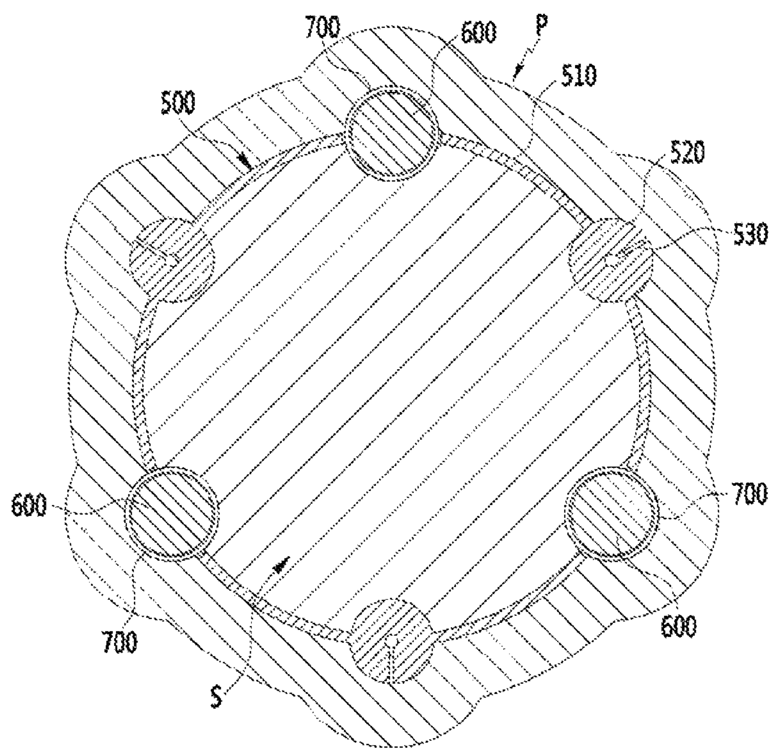
FIG. 7 illustrates a sectional drawing in which the sliding cage of universal joint for vehicle according to the present invention is assembled to the universal joint.
Figure 8:
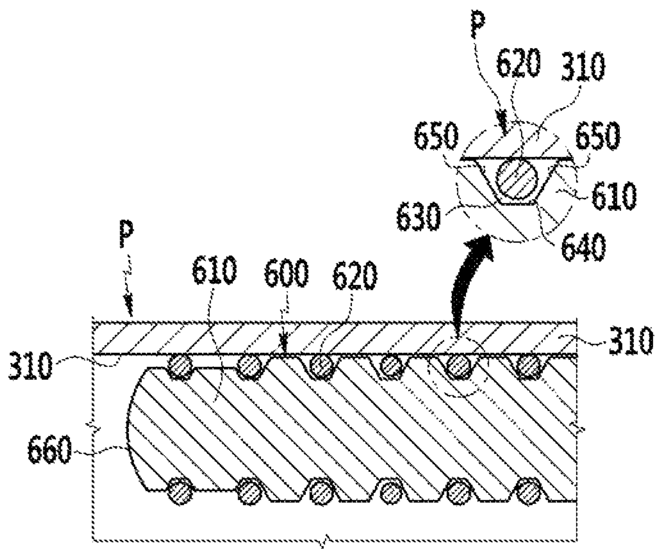
FIG. 8 illustrates an operating state for explaining that the needle bearing in the sliding cage of universal joint for vehicle according to the present invention is elastically touched to the inner side of the pipe joint.

FIG. 1 illustrates an assembly drawing of a universal joint equipped with a sliding cage of universal joint for vehicle according to the present invention; FIG. 2 and FIG. 3 illustrate a perspective view and a front view of the sliding cage of universal joint for vehicle according to the present invention, respectively; FIG. 4 and FIG. 5 illustrate a front view and an exploded view of a needle bearing provided to the sliding cage of universal joint for vehicle according to the present invention, respectively; FIG. 6 illustrates an expanded partial section of FIG. 4.; FIG. 7 illustrates a sectional drawing in which the sliding cage of universal joint for vehicle according to the present invention is assembled to the universal joint; and FIG. 8 illustrates an operating state for explaining that the needle bearing in the sliding cage of universal joint for vehicle according to the present invention is elastically touched to the inner side of the pipe joint.

As illustrated in drawings, a universal joint for vehicle comprises a shaft joint (S), a pipe joint (P), which is a counter component assembled to the shaft joint (S), and a sliding cage (500) assembled to the shaft joint (S).

The shaft joint (S) consists of a shaft part (100) and a yoke part (200), wherein a plurality of serrations (110) are formed in the outer side of the shaft part (100) toward the circumferential direction, and a connection hole (210) is formed in the yoke part (200) for connecting other joint, like spider.

The sliding cage (500) is fixed to the outer side of the end of the shaft joint (S), and a snap ring fixing groove (120) is formed to the end of the shaft part (100) for fixing the sliding cage (500) by using a snap ring, not illustrated.

The pipe joint (P), which is a counter component assembled to the shaft joint (S), consists of a pipe part (300) and a yoke part (400), wherein a spline (310) corresponding to the serrations (110) of the shaft joint (S), is formed to the inside of the pipe part (300), and a connection hole (410) is formed in the yoke part (400) for connecting other joint, like spider.

It may be possible for the spline (310) of the pipe joint (P) to form the pipe part (300) while the spline (310) is formed in the inside of the pipe part (300).

Fixing grooves (320) are formed in the perimeter of the end of the pipe part (300) in the pipe joint (P), thereby being attached to a fixed body.

The shaft part (110) of the shaft joint (S) is inserted to the inside of the pipe part (300) of the pipe joint (P), thereby constructing the universal joint. Further, the sliding cage (500) may be further assembled in the shaft part (100) so that the universal joint is smoothly slipped toward axial direction when the universal joint is installed in vehicles.

The sliding cage (500) comprises a sleeve (510) insertedly fixed to the outside of the shaft part (100) of the shaft joint (S), a plurality of mountings (520) protruded while maintaining distance along the longitudinal direction of the outer side of the sleeve (510), a needle bearing (600) for being fixedly installed to the mountings (520) and line contacting to the inside of the pipe joint (P), and a ball bearing (700) assembled to both ends of the needle bearing (600).

The sleeve (510) is shaped like a cylinder; the mountings (520) are shaped like a circular cylinder; and supporting grooves are formed in the mountings (520), thereby enabling to install the needle bearing (600) and the ball bearing (700) to the supporting grooves in a manner of interference fit.

Further, grooves (530) are formed along the longitudinal direction in the mountings (520) for flowing or storing lubricants such as grease or oil.

The needle bearing (600) includes a needle bearing body (610), and resilient members (620) which are installed to the outer side of the needle bearing body (610).

The needle bearing body (610) is shaped like a cylindrical stick; there are supporting grooves (630) along the circumferential side; and the resilient members (620) are insertedly installed to the supporting grooves (630). The supporting grooves (630) are formed like spirals and the resilient members (620) are shaped like coil springs which are the same as the spiral supporting grooves (630).

The supporting grooves (630) are composed of a bottom surface (640), and sides (650) from which either ends of the bottom surface (640) are extended to the upper part, wherein the bottom surface (640) forms a straight line and the sides (650) form outwardly slanted surfaces.

By forming the outwardly slanted sides (650) in the supporting grooves (630), there is a space for the resilient members (620) of the needle bearing to be slightly moved in case that the shaft joint (S) and the pipe joint (P) of the universal joint are slipped or torque works.

Further, the resilient members (620) may be installed with slight intervals from the bottom surface (640) and the both sides (650) of the supporting grooves (630) and thus, it is possible for the resilient members (620) of the needle bearing to move elastically when the shaft joint (S) and the pipe joint (P) are slipped toward axial direction or deliver torque by rotation.

Substantially, it is shown in the present invention that the resilient members (620) and the ball bearing (700) in the needle bearing are elastically touched to the inner side of the pipe joint (P) when the shaft joint (S) and the pipe joint (P) perform are slipped or deliver torque.

Accordingly, when the shaft joint (S) and the pipe joint (P) of the universal joint are slipped or deliver rotating torque, the resilient members (620) of the needle bearing are always subject to outward elasticity and then, the whole outer side of the resilient members (620) is elastically line contacted to the inner side of the pipe joint (P), thereby causing slip movement and rotating torque delivery. Thus, gaps between the needle bearing (600) and the inside of the pipe joint (P) are not generated by minimizing friction coefficients.

Then, it enables to prevent performance degradation of steering apparatus since gaps between the needle bearing (600) and the inner side of the pipe joint (P) are not generated, and it enables to maintain steering feel in good condition as the same as the initial state in spite of accumulated duration of use.

Further, when the resilient members (620), assembled to the needle bearing (600), are slided by compensating for gaps in the inner side of the pipe joint (P) while torque is applied to the shaft joint (S) and the pipe joint (P), the compressed resilient members (620) and the ball bearing (700) may be slided together along with being elastically contacted to the spline (310), formed in the pipe joint (P).

Furthermore, when torque is applied to the shaft joint (S) and the pipe joint (P), each torque is firstly delivered to the resilient members (620) equipped to the needle bearing (600), secondly to the ball bearing (700) positioned to both sides of the needle bearing (600), and thirdly to the body (610) of the needle bearing (600).

At this time, the ball bearing (700) is not dented due to the body (610) of the needle bearing (600). That is, when torque is applied to the shaft joint (S) and the pipe joint (P), the ball bearing (700) mainly performs smooth sliding and the needle bearing (600) performs dent prevention.

The external diameter (B) of the body (610) of the needle bearing (600) is smaller than the external diameter (A) of the main body and thus, it enables to reduce fore-end frictional resistance of the needle bearing (600) when the shaft joint (S) is slipped along the pipe joint (P).

In addition, having curved surfaces, both ends of the body (610) of the needle bearing (600) are more easily configured to install the needle bearing (600) to the mountings (520) in a manner of interference fit.

As above, the sliding cage (500) equipped with the needle bearing (600) and the ball bearing (700) is insertedly assembled to the ends of the shaft part (100) of the shaft joint (S), and the snap ring fixing groove (120) maintains the assembled condition by using the snap ring, not illustrated.

Figure 9A:
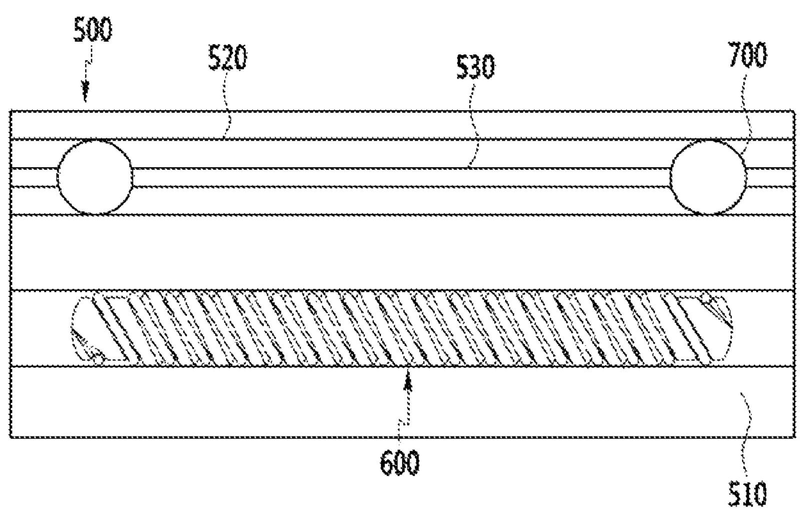
FIG. 9A, 9B and 9C illustrate exemplary drawings for explaining that the needle bearing and a ball bearing, equipped with the sliding cage of universal joint for vehicle according to the present invention, are installed by various ways.
Figure 9B:
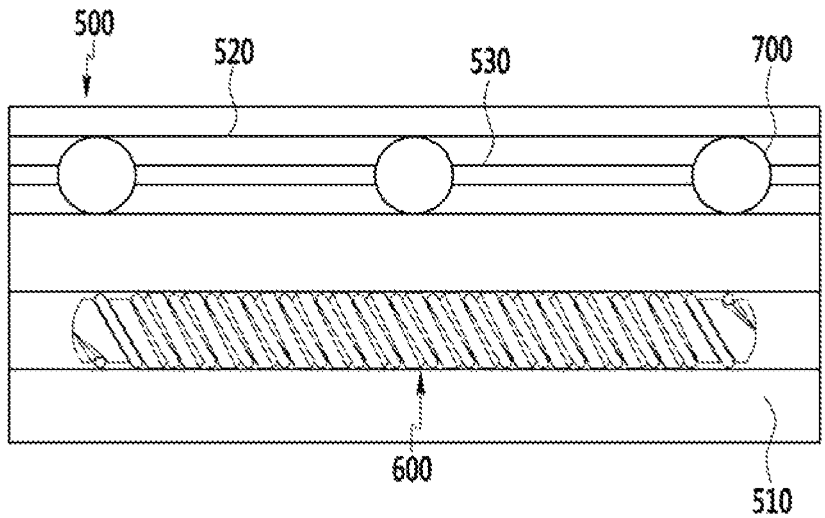
Figure 9C:
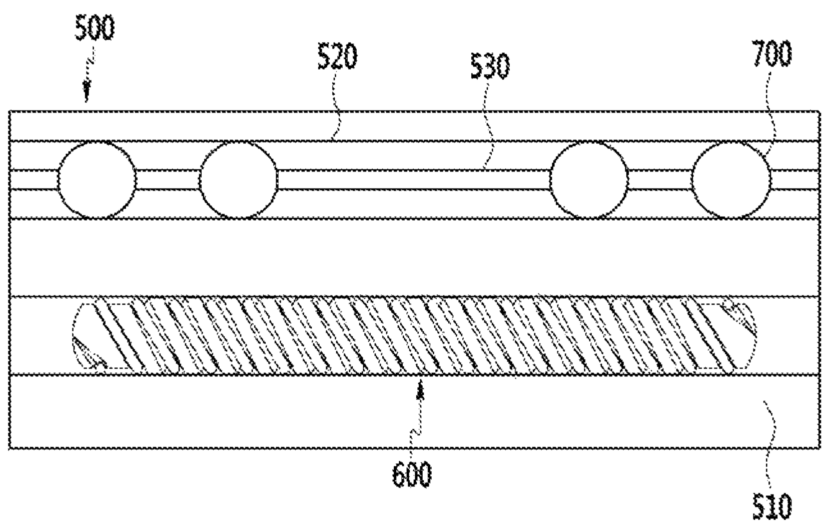

The needle bearing (600) and the ball bearing (700) may be installed together to the same mountings (520) as seen in the embodiments of the present invention, or, as seen in FIGS. 9A, 9B and 9C, the needle bearing (600) may be installed to one mounting and the ball bearing (700) may be installed to another mounting, near above. Here, two or more ball bearings (700) may be installed at a certain interval.

The sliding cage of universal joint for vehicle, as above, assembles the sliding cage (500) to the ends of the shaft part (100) of the shaft joint (S) and its one end is inserted to the inside of the pipe joint (P).

The shaft joint (S) and the pipe joint (P), assembled as above, are ready to be slipped toward axial direction while the serrations (110) and the spline (310) may deliver rotating torque through the sliding cage (500).

Further, the connection hole (210) in the yoke part (200) of the shaft joint (S) is assembled to a steering column, which constructs a steering apparatus in vehicles, by connecting other joint, like spider, and the connection hole (410) in the yoke part (400) of the pipe joint (P) is assembled to a gearbox, which constructs a steering apparatus in vehicles, by connecting other joint, like a spider.

Here, the needle bearing (600) in the sliding cage (500) includes the resilient members (620), made up of coil springs, in the outside of the needle body (610). Thus, when the shaft joint (S) and the pipe joint (P) are slipped or deliver rotating torque, the whole outer side of the resilient members (620) of the needle bearing is elastically line contacted to the inner side of the pipe joint (P), thereby causing slip movement and rotating torque delivery.

That is, as illustrated in FIG. 6, in case that torque is not applied to the universal joint, the resilient members (620) of the needle bearing (600) maintains distance from the supporting grooves, not contacting to the supporting grooves (630) of the needle bearing body (610). At this time, the outer side (external diameter) of the resilient members (620) of the needle bearing (600) is touched to the inner side of the spline (310) of the pipe joint (P), so that the pipe joint (P) may be slipped along the shaft joint (S). Here, the shaft joint (S) and the pipe joint (P) may be more smoothly slided due to the ball bearing (700).

Further, as illustrated in FIG. 8, when torque is applied to the universal joint due to rotation of a steering apparatus, torque is applied to the shaft joint (S) and the pipe joint (P) and then, the surfaces of the needle bearing body (610) and the resilient members (620) are adhered to the inner side of the spline (310) of the pipe joint (P) while the external diameter of the resilient members (620) of the needle bearing (600) is pressurized by the inner side of the spline (310) of the pipe joint (P), compressing the resilient members (620) of the needle bearing (600). It causes rotating torque delivery. Thus, there are no dents because the pipe joint (P) is under surface contact for delivering torque with outward elasticity of the resilient members (620). At this time, the resilient members (620) are not completely adhered to the supporting grooves (630) of the needle bearing body (610), maintaining distance.

Further, when torque stops, the resilient members (620) repeat a process for restoring to an original state by outward elasticity. Thus, even though the universal joint is slipped or torque is applied, the resilient members (620) are not touched to the supporting grooves (630) and are elastically positioned with slight interval.

Accordingly, the universal joint is always subject to elasticity of the resilient members (620). Thus, it enables to prevent performance degradation of steering apparatus since gaps between the needle bearing (600) and the inner side of the pipe joint (P) are not generated, and it enables to maintain goo steering feel as the same as the initial state in spite of accumulated duration of use.

During operation, as above, the ball bearing (700) is located at both ends of the needle bearing (600) and thus, the shaft joint (S) and the pipe joint (P) may be more smoothly slipped toward axial direction due to the ball bearing (700).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

EXPLANATIONS OF NUMERAL REFERENCE

| | |
|---|---|
| S: shaft joint | P: pipe joint |
| 100: shaft part | 110: serrations |
| 120: snap ring fixing groove | 200, 400: yoke part |
| 210, 410: connection hole | 300: pipe part |
| 310: spine | 320: fixing grooves |
| 500: sliding cage | 510: sleeve |
| 520: mountings | 530: groove |
| 600: needle bearing | 610: body |
| 620: resilient members | 630: supporting grooves |
| 640: bottom surface | 650: sides |
| 660: curved surface | 700: ball bearing |

The invention claimed is:

1. A sliding cage of a universal joint of a vehicle, the universal joint comprising a shaft part connected to a pipe part by the sliding cage in an axial direction, the sliding cage comprising:

a sleeve;

a plurality of mountings positioned along a longitudinal direction of an outer surface of the sleeve; and a needle bearing and a first ball bearing and a second ball bearing, all of which are installed in one of the plurality of the mountings, wherein the needle bearing is installed to a central part of one of the plurality of mountings and the first and second ball bearings are installed to both ends of the needle bearing respectively;

wherein the sliding cage is provided to deliver torque while being slipped toward the axial direction.

2. The sliding cage according to claim 1, wherein the needle bearing is cylindrical, and comprises:

a body, which comprises supporting grooves along a circumferential side thereof, and resilient members, assembled to the supporting grooves.

3. The sliding cage according to claim 2, wherein a bottom surface of one of the supporting grooves extends in a straight line in the axial direction and side surfaces, extended from both ends of the bottom surface, form outwardly slanted surfaces.

4. The sliding cage according to claim 2, wherein the supporting grooves comprise spirals and the resilient members are coil springs.

5. The sliding cage according to claim 2, wherein the resilient members are installed at an interval from the bottom surface and both ends of the supporting grooves.

6. The sliding cage according to claim 2, wherein a cross-sectional diameter of both ends of the needle bearing body is smaller than that of the rest of the body.

7. The sliding cage according to claim 2, wherein the needle bearing body has curved surfaces.

8. A sliding cage of a universal joint of a vehicle, the universal joint comprising a shaft part connected to a pipe part by the sliding cage in an axial direction, the sliding cage comprising:

a sleeve;

a plurality of mountings positioned to keep distance along a longitudinal direction of an outer surface of the sleeve; and a needle bearing and a first ball bearing and a second ball bearing, wherein the first and second ball bearings are installed to one of the plurality of mountings, and the needle bearing is installed to another of the plurality of mountings wherein the needle bearing is installed to a central part of the another of the plurality of mountings, and wherein the sliding cage is provided to the universal joint constructing a steering apparatus for vehicle, thereby being assembled to deliver torque while being slipped toward the axial direction.

* * * * *